United States Patent
Koch

(10) Patent No.: US 10,786,933 B2
(45) Date of Patent: Sep. 29, 2020

(54) PROCESS FOR PRODUCING A PLASTIC-METAL COMPOSITE COMPONENT

(71) Applicant: LANXESS Deutschland GmbH, Cologne (DE)

(72) Inventor: Boris Koch, Wermelskirchen (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

(21) Appl. No.: 16/352,120

(22) Filed: Mar. 13, 2019

(65) Prior Publication Data

US 2019/0283295 A1  Sep. 19, 2019

(30) Foreign Application Priority Data

Mar. 14, 2018  (EP) .................................... 18161713

(51) Int. Cl.
| | |
|---|---|
| *B29C 45/14* | (2006.01) |
| *B29L 23/00* | (2006.01) |
| *B29K 705/00* | (2006.01) |
| *B29L 31/00* | (2006.01) |

(52) U.S. Cl.
CPC ........ *B29C 45/14598* (2013.01); *B29C 45/14* (2013.01); *B29C 45/14221* (2013.01); *B29C 45/14836* (2013.01); *B29C 2045/14606* (2013.01); *B29K 2705/00* (2013.01); *B29L 2023/00* (2013.01); *B29L 2031/001* (2013.01)

(58) Field of Classification Search
None
See application file for complete search history.

(56) References Cited

U.S. PATENT DOCUMENTS

| | | | |
|---|---|---|---|
| 5,851,456 A | 12/1998 | mukawa et al. | |
| 2004/0135400 A1* | 7/2004 | Matsuzaki | ........ B29C 45/14598 296/193.02 |
| 2005/0003154 A1* | 1/2005 | White | .................... B32B 27/08 428/141 |

FOREIGN PATENT DOCUMENTS

JP  H 07-100856 A  4/1998

OTHER PUBLICATIONS

European Search Report in corresponding application dated May 14, 2019.

* cited by examiner

*Primary Examiner* — Edmund H Lee
(74) *Attorney, Agent, or Firm* — Norris McLaughlin, P.A.

(57) ABSTRACT

A process for producing a plastic-metal composite component composed of at least one hollow profile and at least one application of plastic to be applied to the outside by means of injection molding or compression.

12 Claims, 2 Drawing Sheets

PROCESS FOR PRODUCING A PLASTIC-METAL COMPOSITE COMPONENT

Figure 1:
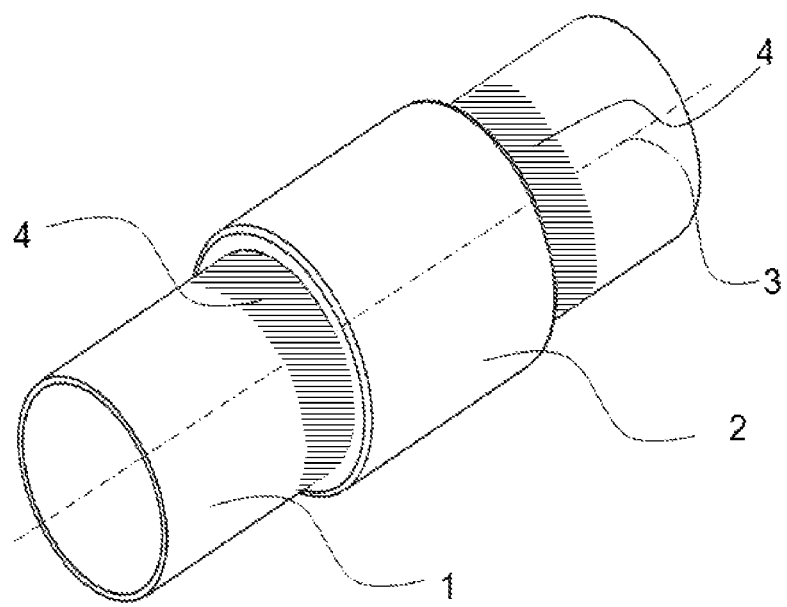

This application claims priority of European Patent Application No. 18161713.5, filed Mar. 14, 2018, the entire contents of which are incorporated herein by reference.

The invention relates to a process for producing a plastic-metal composite component composed of at least one hollow profile and at least one application of plastic to be applied to the outside by means of injection molding or compression molding.

Even now, there are many cases of use of composite components in motor vehicle construction. They are usually produced from a metallic tubular profile or a metallic closed hollow profile that is bonded to at least one separately produced plastics element. The production of two separate components, the metallic tubular or hollow profile and the plastics element, and finally the bonding of these at least two components leads to an elevated level of manufacturing and assembly complexity. For bonding of the tubular or hollow profile to the plastics element(s), moreover, additional bonding means in the form of screws, nuts, rivets or the like are required, which generally in turn requires more construction space and leads to higher weight of the composite component.

Comparable composite components consisting of plastic alone—i.e. both hollow profile and plastics element are made of plastic—given acceptable dimensions of the cross sections show lower strengths and stiffnesses, but also disadvantages in the absorption of energy under abrupt stress, compared to equivalent components made of metallic materials.

PRIOR ART

WO 2009/077026 A1 relates to a process for producing a composite component from a profile and an injection-molded element, wherein the injection-molded element is molded onto the profile such that the profile is captively gripped in peripheral direction and at least one form-fitting element is formed in the profile and is included in the injection-molding operation in that the form-fitting element between the ends of the profile is shaped or molded in a restricted manner in terms of peripheral direction and longitudinal extent.

A disadvantage of the process of WO 2009/077026 A1 is the very complex and costly mechanical bonding of injection-molded plastics component and the profile. Since, according to WO 2009/077026 A1, a hydroforming method (HF) is employed in a combination mold prior to the injection molding process, there is inevitably a limitation to the process with regard to the minimum dimension of the wall thickness of the profile, which opposes a reduction in weight for the purpose of modern lightweight construction. Moreover, a restriction arises with regard to shear stiffness and shear resistance of the bond of injection-molded component to the profile. Since, moreover, the bonding of the two components is based on a form fit, this bond can only be executed by means of insert molding around the profile in the form of a ring, referred to in WO 2009/077026 A1 as circumferential lamella. However, the breadth of such a circumferential lamella is limited since there can otherwise be unwanted high deformation of the profile wall during the HF, extending as far as bursting thereof. An increase in the bond stiffness or bond strength of profile and injection-molded component can therefore be achieved in WO 2009/077026 A1 only by means of an arrangement of multiple circumferential lamellae of this kind across the profile, it being necessary to observe a minimum distance of several millimeters between the circumferential lamellae. According to WO 2009/077026 A1, this distance is generated by cores. If, however, the width of these cores is too small, there is a risk of core breakage and the bursting of the profile since, with use of HF, the tube wall of the profile used in tubular form is both radially extended and axially shifted on the engraved pattern, and the profile at the same time has to be supported across a maximum area. According to WO 2009/077026 A1, it is therefore possible, for a profile area X=100%, to coat only an average proportion of 50% at most with plastic by in-mold coating.

WO 2005/002825 A1 describes a process for producing a plastic-metal composite component at least consisting of a hollow body made of metal or plastic and having at least one opening, to which thermoplastic is applied by injection molding and/or which is subjected to partial or complete insert molding with thermoplastic, wherein the cavity is completely filled with an incompressible liquid in the course of injection molding and/or insert molding. WO 2005/002825 A1 does not disclose any solution with regard to the handling of the tolerance problems with a hollow profile for use in accordance with the invention for production of plastic-metal composite components according to the invention. An oversize hollow profile manufactured according to WO 2005/002825 A1 would not be insertable in a force-free or resistance-free manner into a cavity of an injection mold or compression mold for use in accordance with the invention, and on closure of said injection mold or compression mold would lead to damage either to the hollow profile itself or to the injection mold or compression mold. In the case of too small a hollow profile manufactured according to WO 2005/002825 A1, plastics melt would be applied to the hollow profile in unwanted regions. The problems of the manufacturing tolerances in the hollow profile for use in accordance with the invention are thus not addressed in WO 2005/002825 A1. Manufacture of plastic-metal composite components in a manner suitable for the industrial scale cannot be conducted or assured by the process according to WO 2005/002825 A1.

The problem addressed by the present invention was therefore that of providing a process for producing plastic-metal composite components, in which a thin-wall, metal-based hollow profile is introduced into an injection mold/compression mold and at the same time sealing of at least one cavity for an application of plastic to be applied to the hollow profile and its distribution around the hollow profile is achieved, the plastics component to be applied or which is ultimately applied is additionally bonded to the outside of the hollow profile without deforming the overall outer shape thereof, which gives rise to a radial or else axial form-fitting, mechanically stiffer and more highly durable composite component in the form of a plastic-metal composite component than can be produced according to the above-cited prior art.

In addition, the problem addressed by the present invention was that of bonding hollow profiles that are subject to tolerances from a wide variety of different origins and made of a wide variety of different materials in one and the same injection molding or compression process to plastic functional element(s) in defined regions, wherein the hollow profile is introduced into an injection mold/compression mold in a force-free or resistance-free manner rotated by 90° by its longitudinal axis relative to closure direction and the hollow profile within the mold undergoes reliable radial sealing of its circumferential face at the axial ends of the injection molding or compression molding cavity in order to prevent application of plastic in axial direction in regions where no application of plastic is intended.

Composite components to be produced in accordance with the invention should not have any disadvantages in terms of manufacture, any disadvantages in terms of strength and stiffness properties and also any disadvantages in terms of energy absorption characteristics compared to the prior art, and also assure a high degree of functional integration for the purposes of system or module formation in economically viable manufacture, especially mass production.

SUMMARY OF THE INVENTION

The object is achieved by a process for producing a plastic-metal composite component, especially with a shear-resistant and form-fitting bond of the metal component and plastics component, by a) providing an injection mold/compression mold having at least one openable cavity and a mold dimension A in closure direction and a mold dimension B at right angles to closure direction of the injection mold/compression mold and a cavity circumference UW corresponding to the circumference of the cavity in the region of the injection mold/compression mold dimensions A and B, b) providing at least one hollow profile made of metal with a ratio of diameter to wall thickness in the range from 5:1 to 300:1, the outer dimension C of which is greater by a range of 0.1% to 5% than the mold dimension A, and the outer dimension D of which is smaller by a range of 0.1% to 5% than the mold dimension B, and the figures for C and D are based on 90° viewed in the direction toward the longitudinal axis of the hollow profile, and the hollow profile circumference UH of which corresponds to the cavity circumference UW of the at least one injection mold/compression mold cavity UW specified in a), c) inserting the hollow profile into the at least one cavity of the injection mold/compression mold provided in a), d) closing the at least one cavity of the injection mold/compression mold and pressing the hollow profile by the mold closure movement in closure direction of the at least one cavity, with a change in the shape of the hollow profile provided in b), and where the outer surface of the hollow profile, after the end of the closure operation, corresponds to the inner shape of the cavity of the injection mold/compression mold provided in process step a) in the region of the contact surfaces at the axial ends of the at least one cavity, while the hollow profile circumference UH remains equal to the cavity circumference UW, e) externally applying an application of plastic in the form of a melt with a pressure in the range from 1 bar to 1000 bar to the hollow profile, preferably in the range from 10 bar to 500 bar, more preferably in the range from 50 bar to 300 bar, f) cooling the application of plastic applied to the hollow profile in e) (solidification), and g) removing the finished composite component from the injection mold/compression mold.

Surprisingly, the process according to the invention permits, by virtue of the mold dimensions A and B described in process steps a) and b) and the hollow profile dimensions C and D that have been matched thereto and are described in process step b), insertion of the hollow profile into the injection mold/compression mold with sufficient play and nevertheless achieves, with the proviso of equal circumferences of cavity circumference UW and of hollow profile circumferences UH, on closure of the at least one cavity of the injection mold/compression mold, sealing of the at least one cavity for an application of plastic to be applied to the hollow profile and any distribution thereof about the outer surface of the hollow profile in process step d).

"Sufficient play" in the context of the present invention means that the minimum dimension of the injection mold/compression mold cavity, viewed at right angles to the closure direction of the mold, is greater than, or in the boundary case even equal to, the external dimension of the hollow profile cross section that is subject to tolerances, likewise viewed at right angles to the closure direction of the mold. Preferably, therefore, the smallest dimension of the injection mold/compression mold cavity is in the range from 100% to 105% of the external dimension of the hollow profile cross section, especially 102%, in each case viewed at right angles to the closure direction of the mold.

Surprisingly, the inserting of the hollow profile into the injection mold/compression mold with provision of sufficient play and the sealing of the at least one cavity for an application of plastic to be applied as a melt to the hollow profile and any distribution thereof about the outer surface of the hollow profile works even when the hollow profile circumference UH is lowered by up to +5% compared to the cavity circumference UW of the injection mold/compression mold cavity.

Surprisingly, the process of the invention additionally permits the production of plastic-metal composite components from a metal-based hollow profile without an auxiliary medium that counteracts the injection pressure or compression pressure within the hollow profile and without the use of mold-modifying operations or the use of a (high) internal pressure to be employed additionally according to the prior art in order to establish a seal between the hollow profile which is subject to tolerances and is for use in accordance with the invention and the injection mold/compression mold, but at the same time to provide sufficient support such that the application of plastic applied to the outside is bonded to the hollow profile in a form-fitting, shear-resistant and shear-stiff manner, in that, of an outer surface section of the hollow profile of X=100%, more than 50%, preferably 75% to 100%, more preferably 90% to 100%, is bonded to plastic, preferably by application by injection molding, insert molding, in-mold coating, application by compression molding or insert compression molding. According to the invention, the sealing to the at least one cavity of the injection mold/compression mold is effected by the compression of the hollow profile itself which is described in process step d).

According to the invention, surprisingly, a form-fitting bond in the form of a hybrid component is achieved by insert molding of the metal-based hollow profile with plastic, with blocking of the following degrees of freedom:

radially in all directions about the center axis of the hollow profile, rotationally about an axis at right angles to the center axis of the hollow profile.

Additional blocking in a rotational manner about the center axis and in a translational manner in the direction of the center axis of the hollow profile, in a preferred or alternative embodiment, requires a form-fitting or adhesive bond of hollow profile and plastic applied by injection molding by means of a surface treatment of the outer surface of the hollow profile. Such a surface treatment is preferably effected at least prior to process step b). As a result, blocking of all degrees of freedom is achieved, translationally in X, Y and Z direction and rotationally about the X, Y and Z axis. Preferred forms of surface treatment are the application of at least one adhesion promoter, plasma surface activation, laser structuring, chemical pretreatment or an additive manufacturing process.

Preferred means of chemical pretreatment are the use of acids or bases. A preferred additive manufacturing process is the thermal metal spray application process. See: http//de.wikipedia.org/wiki/Thermisches_Spritzen.

In a further preferred or alternative embodiment, the hollow profile to be provided in process step b) has structural elements, preferably fins, on its outside, which, after the application of plastic in process step e) and the cooling in process step f), form a form-fitting connection/interdigitation with the blocking of all degrees of freedom, translationally in X, Y and Z direction and rotationally about the X, Y and Z axis and hence additionally form a shear-resistant and shear-stiff bond at least in axial direction, preferably in axial and radial direction, based on the hollow profile.

It should be noted for the avoidance of doubt that all referenced definitions and parameters referred to in general terms or within preferred ranges in any desired combinations are encompassed. Standards cited in the context of this application are considered to mean the version in force at the filing date.

Compression in process step d) means deformation of the hollow profile in which no increase in the extent of the hollow profile circumference UH is brought about, merely a change in shape of the hollow profile. In the event of a tolerance-related oversize of the hollow profile circumference UH, a change in shape is preferably brought about, associated with minor compression or reduction in the circumference of the hollow profile circumference UH toward the end of the mold closure movement.

Shear strength is a physical constant that describes the resistance offered by a material to being sheared away, i.e. to separation by forces that attempt to move two adjoining faces in the longitudinal direction. Shear strength is determined by the shear modulus, also called modulus of rigidity. In the context of the present invention, "bonded to one another in a shear-resistant manner" means a form-fitting bond of the hollow profile to at least one plastics element applied to the hollow profile, said bond being shear-stiff in axial direction, preferably in axial and radial direction, of the hollow profile.

Shear stiffness is the product of the shear modulus G of a material and the cross-sectional area AA:

$$\text{Shear stiffness} = G \cdot A \cdot \kappa (= G \cdot A_s)$$

The cross section-dependent correction factor $\kappa$ takes account of the inhomogeneous distribution of shear stress $\tau$ over the cross section. Shear stiffness is often also expressed in terms of the shear area $A_s$. See: https//de.wikipedia.org/wiki/Steifigkeit.

Form-fitting bonds in the context of the present invention arise through the intermeshing of at least two bonding partners that enter into an inextricable bond with one another and can only be separated from one another again by destruction. See: https://de.wikipedia.org/wikiNerbindungstechnik.

PREFERRED EMBODIMENTS OF THE INVENTION

Preferably, before or after process step d), the hollow profile is deformed at at least one position by the action of additional flexural forces at positions where no plastic is applied. Preferably, these additional flexural forces are allowed to act when the final composite component shape differs from the shape of a hollow profile to be provided in process step b), preferably of a hollow profile in straight tube form.

In a further preferred or alternative embodiment, before process step g), the hollow profile is deformed at at least one position by the action of additional flexural forces. Preferably, this deforming can be conducted outside the injection mold/compression mold at any position in the hollow profile.

The invention preferably relates to a process for producing a plastic-metal composite component, especially with a shear-resistant and form-fitting bond of the metal component and plastics component, by a) providing an injection mold/compression mold 5 having at least one openable cavity and a 7 mold dimension A in closure direction and a 8 mold dimension B at right angles to closure direction of the injection mold/compression mold and a 9 cavity circumference UW corresponding to the circumference of the cavity in the region of the injection mold/compression mold dimensions A and B, b) providing at least one hollow profile 1 made of metal with a ratio of diameter to wall thickness in the range from 5:1 to 300:1, the 10 outer dimension C of which is greater by a range of 0.1% to 5% than the 7 mold dimension A, and the 11 outer dimension D of which is smaller by a range of 0.1% to 5% than the 8 mold dimension B, and the figures for C and D are based on 90° viewed in the direction toward the longitudinal axis 3 of the hollow profile 1, and the 12 hollow profile circumference UH of which corresponds to the cavity circumference UW 9 of the at least one compression mold/injection mold cavity specified in a), c) inserting the hollow profile 1 into the at least one cavity of the compression mold/injection mold 5 provided in a), d) closing the at least one cavity of the injection mold/compression mold 5 and pressing the hollow profile 1 by the mold closure movement in closure direction 6 of the at least one cavity, with a change in the shape of the hollow profile 1 provided in b), and where the outer surface of the hollow profile 1, after the end of the closure operation, corresponds to the inner shape of the cavity of the injection mold/compression mold 5 provided in process step a) in the region of the contact surfaces 4 at the axial ends of the at least one injection mold/compression mold cavity, while the hollow profile circumference UH 12 remains equal to the cavity circumference UW 9, e) externally applying an application of plastic 2 in the form of a melt with a pressure in the range from 1 bar to 1000 bar to the hollow profile, preferably in the range from 10 bar to 500 bar, more preferably in the range from 50 bar to 300 bar, f) cooling the application of plastic 2 applied to the hollow profile 1 in e) (solidification), and g) removing the finished composite component from the injection mold/compression mold 5.

Process Step a)

Process step a) relates to the providing of an injection mold/compression mold having at least one openable cavity and a mold dimension A in closure direction and a mold dimension B at right angles to closure direction of the mold and a cavity circumference UW corresponding to the circumference of the at least one cavity in the region of mold dimensions A and B. According to the invention, the closure direction relates to the injection mold/compression mold to be used. Preferably, an injection mold/compression mold for use in accordance with the invention has two mold halves. According to the configuration of the composite component to be manufactured, however, the mold halves may in turn consist of multiple segments. The person skilled in the art will adapt the design of the injection mold/compression mold to be used in accordance with the composite component to be manufactured. A summary of injection molds/compression molds for use in accordance with the invention and of manufacturers thereof can be found, inter alia, in W. Michaeli, G. Menges, P. Mohren, Anleitung zum Bau von Spritzgießwerkzeugen [How to Make Injection Molds], 5th fully revised edition, Carl Hanser Verlag Munich Vienna 1999 (English edition 2001).

Preferably, an injection mold/compression mold for use in accordance with the invention has the following features in order that a hollow profile for use in accordance with the invention with all its dimensional and shape tolerances can be inserted without force into the injection mold/compression mold:

aI. The injection mold/compression mold has to be such that it seals the injection mold/compression mold cavities with respect to the regions of the hollow profile in which no plastic is applied in process step e) on closure of the mold. For this purpose, the injection mold/compression mold needs, at the axial ends of the injection molding/compression molding cavities, contact surfaces in the mold that compress the hollow profile during the closure of the mold from its outer hollow profile dimension C to the mold dimension A, which simultaneously alters the outer hollow profile dimension D to the mold dimension B, and where the hollow profile circumference UH remains identical to the cavity circumference UW of the at least one injection mold/compression mold cavity;

aII. In one embodiment, the contact surfaces of the at least two mold halves with respect to the hollow profile in the injection mold/compression mold are executed such that a greater hollow profile circumference UH by up to +5% over and above the compression described in aI. is additionally pressed onto the same cavity circumference UW described in aI.;

aIII. The contact surfaces of the at least two mold halves in the injection mold/compression mold that have been mentioned in aI. and aII., with the mold closed, enclose the hollow profile over its entire extent and preferably have a width, i.e. an extent viewed in axial direction of the hollow profile, in the range from 1.0 to 50.0 mm, preferably 3.0 to 25.0 mm, more preferably 5.0 to 10.0 mm;

aIV. In one embodiment, the contact surfaces of the at least two mold halves with respect to the hollow profile in the injection mold/compression mold are executed such that these regions in the mold are constituted by hardened inserts. Preferably, the hardened inserts have a Rockwell hardness in the range from 50 to 62 HRC. The hardness is thus within the region of customary bending and punching tools. See: https://de.wikipedia.org/wiki/Rockwell_(Einheit);

aV. The injection mold/compression mold has to offer clear space around the hollow profile between its contact surfaces outside the at least one cavity. This clear space is preferably in the range from 1.0 to 10.0 mm.

Process Step b)

In process step b), at least one hollow profile with a ratio of diameter to wall thickness in the range from 5:1 to 300:1, preferably in the range from 10:1 to 200:1, more preferably in the range from 10:1 to 100:1, is provided, the outer hollow profile dimension C of which is greater by a range of 0.1% to 5% than the mold dimension A of the cavity, and the outer hollow profile dimension D of which is smaller by a range of 0.1% to 5% than the mold dimension B of the at least one cavity, and the hollow profile circumference UH of which corresponds to the cavity circumference UW specified in process step a). According to the invention, the figures for the outer hollow profile dimensions C and D of the hollow profile to be provided in process step b) are based on 90° viewed in the direction toward the longitudinal axis of the hollow profile, and the figure for UH is based on the region of outer hollow profile dimension C and D.

A hollow profile for use in accordance with the invention can be produced by various methods, have various cross-sectional shapes and consist of various materials. Preferably, it is produced using at least one of the techniques of strand pressing, strand drawing, extrusion, blow molding, injection molding, seamless drawing, longitudinal welding, spiral welding, winding and pultrusion. A thin-walled hollow profile for use in accordance with the invention may have a circular, elliptical or polygonal—triangular, quadrangular, pentangular etc. up to and including a polyangular—cross section.

"Thin-wall" in the context of the present invention preferably means a ratio of diameter of a hollow profile for use in accordance with the invention to wall thickness thereof in the range from 5:1 to 300:1, more preferably in the range from 10:1 to 200:1, most preferably in the range from 10:1 to 100:1.

Preferably, a hollow profile to be provided in process step b) has a wall thickness in the range from 0.1 to 10.0 mm. A hollow profile for use in accordance with the invention preferably has at least two openings, one at each end face.

Hollow profiles for use in accordance with the invention have been manufactured from a metal, where metal also includes alloys.

Preferred metals for production of hollow profiles for use in accordance with the invention are steel, aluminum, magnesium, copper, titanium, tin, zinc, lead, silver, gold or alloys thereof, especially steel, $AlMgSi_{0.5}$ or brass.

Particular preference is given to using hollow profiles made of aluminum or steel, especially alloys of these two materials. The person skilled in the art is aware of such alloys from the production of semifinished products. In the case of aluminum alloys, the person skilled in the art is aware that magnesium increases strength but simultaneously significantly reduces formability, whereas silicon here has only minor effects. These two properties are affected only moderately by manganese and only slightly by zinc. Copper significantly increases strength and is favorable for ductility. (See: W. Hartmann & Co. (GmbH & Co. KG), 2018: produktinfos/ff2/index_ger.html). In the case of aluminum or aluminum alloys, reference is additionally made to D. Altenpohl, Aluminium and Aluminiumlegierungen [Aluminum and Aluminum Alloys], Springer Verlag Berlin Heidelberg, 1965. With regard to steel alloys, reference is made to DIN EN 10020, DIN EN 10208, DIN EN 10216, DIN EN 10217 and DIN EN 10130.

Typical processes for production of semifinished hollow profiles are known to those skilled in the art as strand pressing, rolling and roll forming.

Preferably, hollow profiles for use in accordance with the invention or the metals or alloys for use therein have an elongation at break >3%. Elongation at break A {\displaystyle A} is an index in material sciences that states the remaining extension of the tensile sample after fracture, based on the starting measurement length. It characterizes the deformation capacity or ductility of a material and can be defined differently in accordance with the characteristic mechanical properties of the types of material and also identified by different symbols. Elongation at break is the remaining change in length Δ L {\displaystyle \Delta L} after fracture, based on the starting measurement length L 0 {\displaystyle L_{0}} of a sample in the tensile test. The starting measurement length L 0 {\displaystyle L_{0}} is fixed prior to the tensile test by measurement marks on the tensile sample. See: https://de.wikipedia.org/wiki/Bruchdehnung.

If other production processes than the aforementioned hollow profile production processes should be employed for the purpose of minimization of manufacturing tolerances, it is also possible to employ materials with an elongation at break of <3%.

Preference is given in accordance with the invention to using round metal tubes, rectangular metal tubes or square metal tubes as hollow profile. Tubes of this kind are supplied, for example, by Mifa Aluminium B.V., Rijnaakkade 6, 5928 PT Venlo, the Netherlands.

Process Step c)

As well as the configuration of the metal-based hollow profile to be provided in process step b), the configuration of the injection mold/compression mold to be provided in process step a) is likewise important in order that the process according to the invention, especially the insertion and sealing of the at least one cavity, works without difficulty.

The hollow profile is inserted here into the at least one cavity without extension of the hollow profile. The join between hollow profile and the cavity of the injection mold/compression mold that adjoins the hollow profile section to be provided with application of plastic is sealed solely on closure of the injection mold/compression mold via a change in shape of the circumference of the hollow profile, while the hollow profile circumference UH itself remains unchanged.

In the case of the preferred use of hollow profiles with a round circumference, where the hollow profile has the shape of a tube, there is a change in shape preferably to an ellipse. In the case of use of hollow profiles with elliptical circumference, there is preferably a change in shape to a round circumference.

Preferably, the ratio of the hollow profile circumference UH to the inner cavity circumference UW is 1:1. It is extremely surprising to the person skilled in the art that solely the closing motion of the injection mold/compression mold and the resulting change in shape of the hollow profile with respect to the inner circumference of the mold cavity UW reliably seals the gap or join and hence seals it for the injection molding or compression operation, and, even in the case of a tolerance-related oversize of the hollow profile circumference UH by up to +5%, excess material for the hollow profile wall is not injected into the separation planes of the injection mold/compression mold. This ensures that there can be no damage to the mold, especially damage to the separation planes, nor damage to the hollow profile itself. This property of the process according to the invention, the change in shape of the hollow profile with the closure of the injection mold/compression mold and hence simultaneously the sealing of the mold cavity with respect to the outer hollow profile surface, allows the subsequent and locally restricted application of plastic to the metal-based hollow profile in process step e) without auxiliaries positioned within the hollow profile that counteract the injection or compression pressure and hence, by comparison with the prior art, without additional process steps and with distinctly shortened cycle times.

Preferably, an injection mold/compression mold for use in accordance with the invention and also a metal-based hollow profile for use in accordance with the invention have the following features in order that the latter with all its dimensional and shape tolerances can be inserted without force into the mold provided in process step a):

cI. The injection mold/compression mold has to be such that it seals the injection molding or compression cavities with respect to the regions of the hollow profile in which there is no application of plastic in process step e) on closure of the mold. For this purpose, the injection mold/compression mold needs, at the axial ends of the at least one cavity, contact surfaces in the mold that compress the hollow profile during the closure of the mold from the outer hollow profile dimension C to the mold dimension A, which simultaneously alters the outer hollow profile dimension D to the mold dimension B, but the hollow profile circumference UH remains equal to the cavity circumference UW;

cII. In one embodiment, the contact surfaces of the at least two mold halves with respect to the hollow profile in the injection mold/compression mold are executed such that a +5% greater hollow profile circumference UH over and above the compression described in cI. is additionally pressed onto the same cavity circumference UW described in cI.;

cIII. The contact surfaces of the at least two mold halves in the injection mold/compression mold that have been mentioned in cI. and cII., with the mold closed, enclose the hollow profile over its entire extent and preferably have a width, i.e. an extent viewed in axial direction of the hollow profile, in the range from 1.0 to 50.0 mm, more preferably 3.0 to 25.0 mm, most preferably 5.0 to 10.0 mm;

cIV. In one embodiment, the contact surfaces of the at least two mold halves with respect to the hollow profile in the injection mold/compression mold are executed such that these regions in the mold are constituted by hardened inserts. These hardened inserts preferably have a Rockwell hardness in the range from 50 to 62 HRC. The hardness is thus within the region of customary bending and punching tools. See: https://de.wikipedia.org/wiki/Rockwell_(Einheit), cV. Preferably, the injection mold/compression mold offers clear space around the hollow profile between its contact surfaces outside the injection molding or compression molding cavities. This clear space is preferably in the range from 1.0 to 10.0 mm.

Process Step d)

In process step d), the at least one cavity of the injection mold/compression mold is closed and the hollow profile is compressed by the mold closure movement in closure direction of the at least one cavity, with a change in shape of the hollow profile provided in b) in that the outer surface of the hollow profile, after the end of the closure operation, corresponds to the inner shape of the cavity of the injection mold/compression mold provided in process step a) in the region of the contact surfaces at the axial ends of the at least one injection molding/compression molding cavity. The closure of the at least one cavity makes the outer dimension C identical to the mold dimension A and the outer dimension D identical to the mold dimension B. The hollow profile circumference UH still corresponds to the cavity circumference UW.

By means of the contact surfaces described in process step c) in the injection mold/compression mold, the hollow profile in process step d) is clearly kept within the at least one cavity and the cavities in the hollow profile that are provided for the injection molding or for the compression are sealed.

The closing of the injection mold/compression mold requires a compression force that compresses the hollow profile to a new shape defined by the configuration of the cavity of the injection mold/compression mold, and a closure force for the injection molding process in order to seal the at least one cavity. The level of the compression force is guided by the shape of the metal-based hollow profile provided in process step b). Moreover, the shape, dimensions, wall thickness and material properties of the metal-based hollow profile are crucial for the pre-calculation of the compression force to be applied, which has to be taken into account by the person skilled in the art in the design of the process according to the invention.

The compression force to be expended for the compression of the hollow profile in process step d) is preferably below the closure force of the injection mold in the case that an injection molding process is employed for the application of plastic.

In the case of application of plastic by mold pressing, the pressing force to be employed for the compression of the hollow profile in process step h) is in the region of the closure force of the compression mold to be used for this purpose+/−10%.

The level of the closure force of the injection mold/compression mold is guided by the projected area for the application of plastic in process step e) and the injection pressures that are required to inject or to compress the corresponding plastics in process step i).

Preferably in accordance with the invention, the compression in process step h) is effected until:
Outer hollow profile dimension C=mold dimension A and
Outer hollow profile dimension D=mold dimension B and
Hollow profile circumference UH=cavity circumference UW.

In this case, the cavity has been sealed over its circumference with respect to the hollow profile and the mold has been stressed to the least degree at the contact surfaces.

If it is the case that the outer hollow profile dimension C or D or the hollow profile circumference UH is too small and the deformation by the mold is insufficient to achieve outer hollow profile dimension D=mold dimension B, this would leave a gap. In this case, the tolerances of the hollow profile have to be chosen such that this case does not occur.

If the outer hollow profile dimension A or the hollow profile circumference UH chosen is too high, the outer hollow profile dimension D reaches the mold dimension B before the mold is completely closed, which leads to tangential compression of the hollow profile wall. In this case too, therefore, the tolerances of the hollow profile should be chosen such that compression occurs up to a maximum of compressive expansion of the material, but there is no occurrence of escape of the hollow profile wall into cavities between the separation surfaces of the injection mold/compression mold. In this case, the cavity has likewise been sealed over its circumference with respect to the hollow profile but the mold has been subjected to relatively high stress at the contact surfaces.

Process Step e)

In process step e), plastic is applied in the form of a melt to the outer wall of the hollow profile. The level of the injection and hold pressures that are to be employed in process step e), the injection rates, the changeover times between injection and maintaining hold pressure, the hold pressure times, the melt and mold temperatures and the residual mass cushion of the plastic applied are additionally dependent on the plastic materials to be used, the geometry of the cavity/cavities to be filled with plastic, the position of the application on the hollow profile, the sprue in the case of injection molding, and the durability of the hollow profile provided in process step b) and inserted in process step c), which has to be taken into account in advance by the person skilled in the art in the design of the process of the invention.

The compression of the hollow profile in process step e), especially by means of the mold contact surfaces described in process step c), achieves sealing of the injection mold/compression mold to counter escape of the plastic to be applied in process step e) between regions of the hollow profile with applied plastic and without applied plastic within the mold cavity. In one embodiment, the mold contact surfaces are executed in such a way that these regions in the mold are constituted by hardened inserts.

The execution of hardened mold inserts described in process step c) under point cIV. serves, in process step d) and in process step e), to reduce the wear on the mold contact surfaces since these are the only contact sites between injection mold/compression mold and hollow profile and the hardened mold inserts preferably have distinctly higher hardness than the material of the hollow profile.

The application of plastic to the at least one hollow profile in process step e) is preferably effected by injection molding or compression molding, especially injection molding.

Application of Plastic by Injection Molding

According to DIN 8580, manufacturing processes for production of geometric solid bodies are divided into six main groups. Injection molding is assigned to main group 2, primary forming. It is especially suitable for mass-produced articles. Reworking in the case of injection molding is minor or can be dispensed with entirely, and even complicated shapes and outlines can be manufactured in one operation. Injection molding as a manufacturing method in plastics processing is known in principle to those skilled in the art; See: https://de.wikipedia.org/wiki/Spritzgie%C3%9Fen.

In injection molding, an injection molding machine is used to liquefy or plastify the plastic to be processed and inject it into a mold, the injection mold, under pressure. In the mold, the plastic is converted back to the solid state as a result of cooling or as a result of crosslinking reaction and, after the opening of the mold, is removed as a finished part. It is the cavity of a mold that determines the shape and surface structure of the solidified applied plastic in the final product, in the plastic-metal composite component in the present invention. Nowadays, products in the weight range from a few tenths of a gram up to an order of magnitude of 150 kg are producible by injection molding.

Injection molding permits a virtually free choice of shape and surface structure, in particular smooth surfaces, grains for touch-friendly regions, patterns, engravings and color effects. Together with economic viability, this makes injection molding the most commonly used process for mass production of plastic parts in virtually all sectors.

An injection molding apparatus comprises at least the following components: 1. screw 2. intake funnel 3. pellets 4. plastifying barrel 5. heating elements 6. mold.

The following steps are effected within an injection molding apparatus: 1. plastifying and metering, 2. injecting, 3. maintaining hold pressure and cooling, and 4. demolding.

1. Plastifying and Metering

The thermoplastic to be used with preference for the injection molding trickles into the flights of a rotating screw in the form of a granular material. The granular material is conveyed in the direction of the screw tip and is heated and melted by the heat of the barrel and the heat of friction that arises in the division and shearing of the material. The melt collects in front of the screw tip since the exit nozzle is closed at first. Since the screw is axially movable, it retracts as a result of the pressure and screws out of the material like a corkscrew. The backward motion is attenuated by a hydraulic cylinder or by electrical means, such that a backpressure builds up in the melt. This backpressure in conjunction with the screw rotation compresses and homogenizes the plastic to be injected as injection molding material.

The screw position is measured and, as soon as an amount of injection molding material sufficient for the workpiece volume has collected, the metering operation is ended and the screw rotation is stopped. The stress on the screw is likewise actively or passively released, such that the melt is decompressed.

2. Injecting

In the injection phase, the injection unit is moved to the closure unit, the exit nozzle is pressed against it and the screw is put under pressure on the reverse side. This forces the melt under high pressure, preferably at a pressure in the range from 200 to 2000 bar, through the opened exit nozzle and the runner or runner system of the injection mold into the shaping cavity. A nonreturn barrier prevents backflow of the melt in the intake funnel direction.

During the injection, an attempt is made to achieve very substantially laminar flow characteristics of the melt. This means that the melt is immediately cooled in the injection mold when it touches the cooled mold wall and "sticks" in solidified form. The subsequent melt is forced through the resultant narrowing melt channel at even higher velocity and with even more shear deformation and is subjected to expansive deformation at the melt front toward the edge. Removal of heat via the mold wall occurs concurrently with supply of heat through shear heating. The high injection rate produces a shear velocity in the melt that allows the melt to flow more easily. Rapid injection is not the aim since high shear velocities can cause increased molecular degradation within the plastic. The surface of the product to be produced by injection molding, the appearance thereof and ultimately the state of orientation of the plastic molecules are also affected by the injection phase.

3. Maintaining Hold Pressure and Cooling

Since the mold is colder than the plastic material, the mold preferably having a temperature in the range from 20 to 120° C. and the plastic material preferably having a temperature in the range from 200 to 300° C., the melt cools down in the mold and solidifies on attainment of the solidification point of the particular plastic used, preferably of the thermoplastic or thermoplastic-based compound.

Compounding is a term from the plastics industry, synonymous with plastics processing, that describes the process of upgrading plastics by mixing in admixtures (fillers, additives etc.) for specific optimization of the profiles of properties. Compounding is preferably effected in extruders and comprises the process operations of conveying, melting, dispersing, mixing, degassing and pressure buildup; see: https://de.wikipedia.org/wiki/Compoundierung. A compound therefore refers to a thermoplastic or thermoset with added fillers or additives.

The cooling on attainment of the solidification point of the particular plastic used is associated with a volume shrinkage that has an adverse effect on trueness to scale and surface quality of the product to be manufactured, in the present invention the plastics element that is to be manufactured in process step e) and bonded in a form-fitting manner to the outside of the hollow profile. In order to partly compensate for this shrinkage, even after the filling of the mold, a reduced pressure is also maintained in order that further plastic material can flow in and compensate for the shrinkage. This hold pressure can be maintained until the sprue has solidified.

After the hold pressure phase has ended, the exit nozzle can be closed and the plastifying and metering operation for the next molding can already commence in the injection unit. The plastics material in the mold cools down further in the residual cooling time until the center, the liquid core of the application of plastic, has also solidified and achieved a stiffness sufficient for demolding. This operation is also referred to as solidification and, according to the invention, proceeds in process step f) for the application of plastic.

The injection unit can then be moved away from the closure unit since no plastic can escape from the sprue any longer. The purpose of this is to prevent transfer of heat from the warmer exit nozzle to the colder sprue.

4. Demolding

For demolding of an injection-molded product, or of the hollow profile that has been endowed with applied plastic in the inventive process step e), the cavity is opened and the product is ejected by means of pins that penetrate into the cavity and either falls out (bulk material) or is removed from the injection mold by handling devices and laid down in an orderly manner or sent directly to further processing. Preferably, for this purpose, the injection mold/compression mold is provided with an ejector side.

The sprue either has to be removed by separate processing or is automatically severed in the demolding operation. Sprueless injection molding is also possible with hot runner systems in which the runner system remains constantly above the solidification temperature of the plastic to be used, preferably thermoplastic, thermoset or compound, and the material present can thus be used for the next shot.

Application of Plastic by Compression Molding

Compression molding belongs to the family of primary forming methods. Compression molding is a production method for plastics suitable for slightly curved or flat components. The main field of use of this method is the automotive industry, where it is used for production of relatively large components having two-dimensional or simple three-dimensional structure, especially engine hoods, shock absorbers, spoilers or tailgates. It is possible to process either thermoset or thermoplastic materials.

At the start of the compression molding process, the molding compound to be processed is introduced into the heated cavity provided. Then the cavity is closed using a pressure piston. As a result of the pressure, the molding compound takes on the shape defined by the mold. In the case of thermoset materials the temperature serves to affect the hardening operation, and in the case of thermoplastics to melt the plastic. After the cooling, the finished product can be removed from the mold and optionally processed further.

The compression molding method is particularly suitable for moderate numbers of items, since the mold costs in this case are generally lower than in the case of injection molding, for example. Compression molding can also be used for production of fiber composite materials, including for production of fiber-reinforced plastics.

See: https://de.wikipedia.org/wiki/Formpressen

A known compression molding process for thermoplastics is, in particular, the D-LFT (direct long fiber thermoplastic molding) method as described, for example, in DE-A 43 30 860.

Known compression molding methods for thermosets are, in particular, the SMC (sheet molding compound) method and the BMC (bulk transfer molding compound) method. An SMC method is described, for example, in EP 1 386 721 A1. With regard to BMC methods see: Handbuch Spritzgießen [Injection Moulding Handbook], ISBN 978 3 446 15632 6, 1st edition 2001, pages 1022-1024, Carl Hanser Verlag.

Plastics to be Applied in Process Step e)

Plastics to be applied in process step e) are preferably thermoplastics or thermosets, more preferably thermoplastics.

Preferred thermoplastics are polyamides (PA), polyesters, especially polybutylene terephthalate (PBT) or polyethylene terephthalate (PET), polyethylene (PE), polypropylene (PP) or polyvinyl chloride (PVC). The thermoplastic used in process step e) is more preferably polyamide or polyester. The polyamide used is preferably a nylon-6. In particular, the polyester used is PBT. Preferred thermosets are epoxy resins, crosslinkable polyurethanes or unsaturated polyester resins.

The thermoplastic or thermoset is preferably used in the form of a compound.

More preferably, the plastic to be applied in process step e) is produced from a thermoplastic with at least one filler or reinforcer. Preference is given to using at least one filler or reinforcer from the group of carbon fibers [CAS No. 7440-44-0], glass beads or solid or hollow glass beads, or glass fibers, or ground glass, especially each based on aluminum borosilicate glass having an alkali content of 1% (E glass) [CAS No. 65997-17-3], amorphous silica [CAS No. 7631-86-9], calcium silicate [CAS No. 1344-95-2], calcium metasilicate [CAS No. 10101-39-0], magnesium carbonate [CAS No. 546-93-0], kaolin [CAS No. 1332-58-7], calcined kaolin [CAS No. 92704-41-1], chalk [CAS No. 1317-65-3], kyanite [CAS No. 1302-76-7], powdered or ground quartz [CAS No. 14808-60-7], mica [CAS No. 1318-94-1], phlogopite [CAS No. 12251-00-2], barium sulfate [CAS No. 7727-43-7], feldspar [CAS No. 68476-25-5], wollastonite [CAS No. 13983-17-0] and montmorillonite [CAS No. 67479-91-8]. Particular preference is given to using glass fibers.

Especially preferably, fillers or reinforcers are used in amounts in the range from 0.1 to 150 parts by mass per 100 parts by mass of the thermoplastic. Very especially preferably, fillers or reinforcers are used in amounts in the range from 15 to 150 parts by mass per 100 parts by mass of the thermoplastic.

Especially preferably, in process step e), an application of plastic composed of glass fiber-reinforced nylon-6 with 15 to 150 parts by mass of glass fibers per 100 parts by mass of polyamide is used in the injection molding process. Compounds of this kind are available under the Durethan® name from Lanxess Deutschland GmbH, Cologne.

A thermoset to be applied in process step e) also preferably contains at least one of the abovementioned fillers or reinforcers. Preferably, the thermoset comprises glass fibers or carbon fibers as filler or reinforcer. Especially preferably, 10 to 150 parts by mass of glass fibers or carbon fibers as filler or reinforcer are used per 100 parts by mass of the thermoset.

Process Step f)

In process step f), the plastic applied or overmolded plastic is cooled down, also referred to as solidification. The term "solidification" describes the hardening of the molten plastic applied in process step e) as a result of cooling or chemical crosslinking to give a solid body. In the case of simultaneous shaping, it is possible in this way to directly apply functional elements, structures and surfaces to the outer hollow profile wall.

In one embodiment of the present invention and in the case of a further above-described surface treatment, after the solidification of the plastics melt on the outer surface of the hollow profile, preferably a metal tube, the result is an application of plastic in the form of a continuous plastics ring having a structured inner surface that exactly constitutes the positive image of the surface structure of the outer wall of the hollow profile, preferably the metal tube.

An inventive shear-resistant, shear-stiff, highly durable and form-fitting bond around the outer wall of the hollow profile, preferably around the outer wall of the hollow profile in the form of a metal tube, is the result.

Further details of process step f) have already been described above in the "Maintaining hold pressure and cooling" section.

Process Step g)

In process step g), the finished plastic-metal composite component is removed from the injection mold/compression mold since, with solidification of the plastics melt, the pressure in the application of plastic is no longer present and the compression force and closure force has been dissipated with the opening of the mold. Further details have already been described above in the "Demolding" section.

Plastic-Metal Composite Component

Plastic-metal composite components to be produced in accordance with the invention are used in corresponding configuration preferably for motor vehicle construction, especially in automobile construction. The plastic-metal composite component is preferably a motor vehicle bodywork part, especially a cross car beam (CCB). Cross car beams are known, for example, from U.S. Pat. No. 5,934, 744 A or U.S. Pat. No. 8,534,739 B.

Likewise preferably, the plastic-metal composite component is a motor vehicle bodywork part, especially a front-end module carrier, also referred to as "Grill Opening Reinforcement" or as "Bolster". Front-end module carriers are known, for example, from EP 0 519 776 A1.

In the plastic-metal composite component of the invention, also referred to as hybrid component owing to the two components, the hollow profile and the application of plastic applied in process step e) by means of a plastics melt reinforce and strengthen one another. Moreover, the application of plastic to the outer wall of the hollow profile applied in process step e) additionally serves for integration of function for the purposes of system or module formation for attachment of plastics structures or plastics surfaces.

The present invention is elucidated by FIG. 1, FIG. 2, FIG. 3 and FIG. 4:

FIG. 1 shows a composite component to be produced in accordance with the invention by the injection molding/compression molding method, in which (1) represents the hollow profile, here in the embodiment of a tube with an elliptical cross-sectional form, and (2) represents an application of plastic bonded to the hollow profile in a form-fitting or adhesive manner. (3) shows the longitudinal axis of the hollow profile. (4) shows the contact surfaces for sealing that are present alongside the application of plastic (2) on the hollow profile, in the range of 1.0-10.0 mm, viewed in the direction of longitudinal axis (3).

Figure 2:
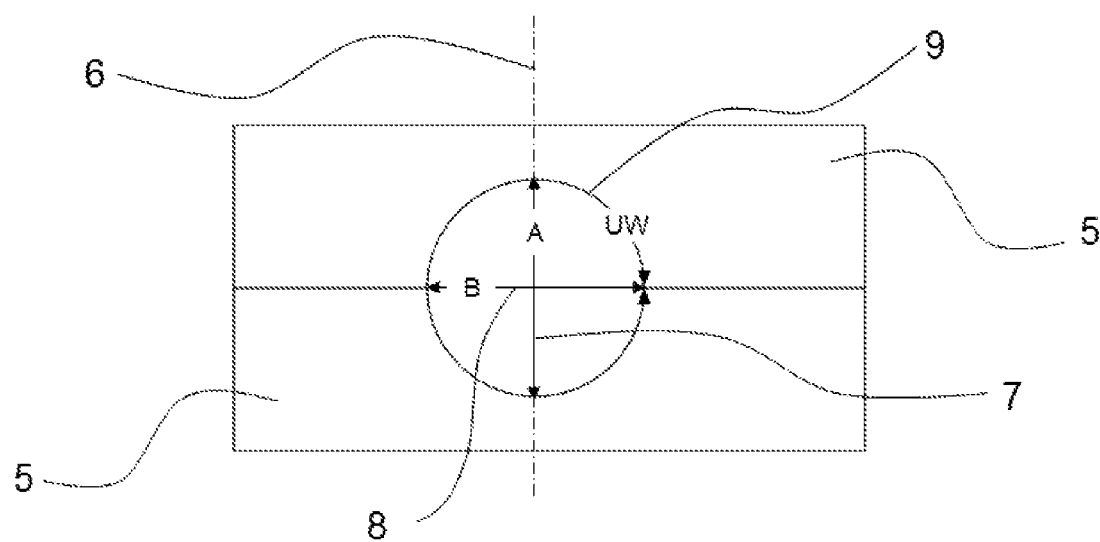

FIG. 2 shows the cross section of an injection mold/compression mold (5) to be used in accordance with the invention in the closed state with the opening and closing direction (6) in the region of the contact surfaces to the seal (4) present alongside the application of plastic (2) on the hollow profile, in the range of 1.0-10.0 mm, viewed in the direction of the longitudinal axis of the hollow profile (3). (7) shows the mold dimension A of the mold cavity viewed in closure direction. (8) shows the mold dimension B of the mold cavity viewed at right angles to closure direction, and (9) the cavity circumference UW in the region of mold dimensions A and B.

Figure 3:
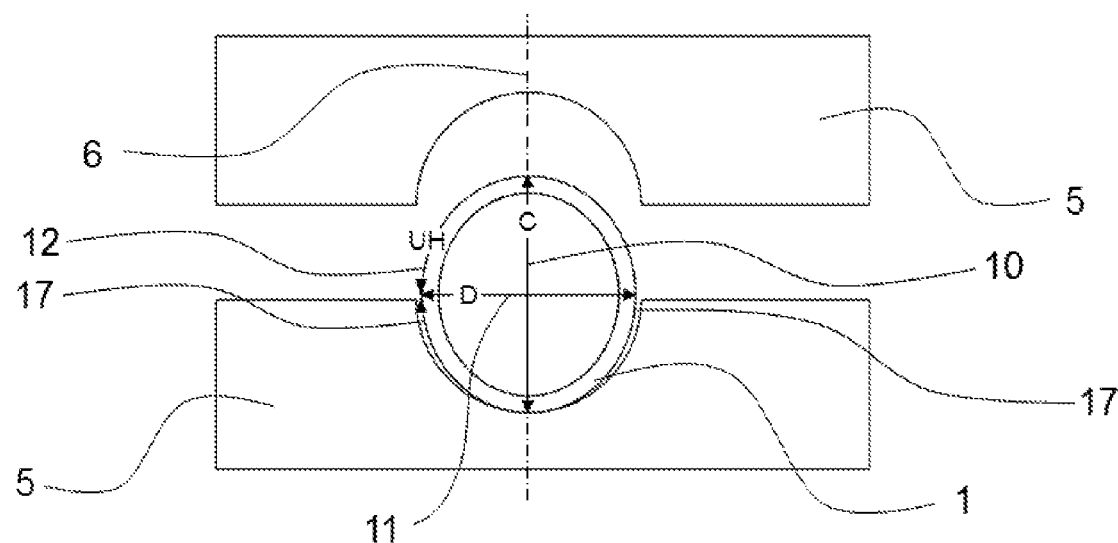

FIG. 3 shows the cross section of an open injection mold/compression mold (5) with the hollow profile (1) inserted in the region of the contact surfaces to the seal (4) present alongside the application of plastic (2) on the hollow profile (1), in the range of 1.0-10.0 mm, viewed in the direction of the longitudinal axis of the hollow profile (3) (see FIG. 1). (10) shows the outer dimension C of the hollow profile (1) viewed in closure direction. (11) shows the outer dimension D of the hollow profile (1), and (12) shows the hollow profile circumference UH of the hollow profile (1) in the region of the hollow profile dimension C and D. (17) shows the play between hollow profile and mold cavity.

Figure 4:
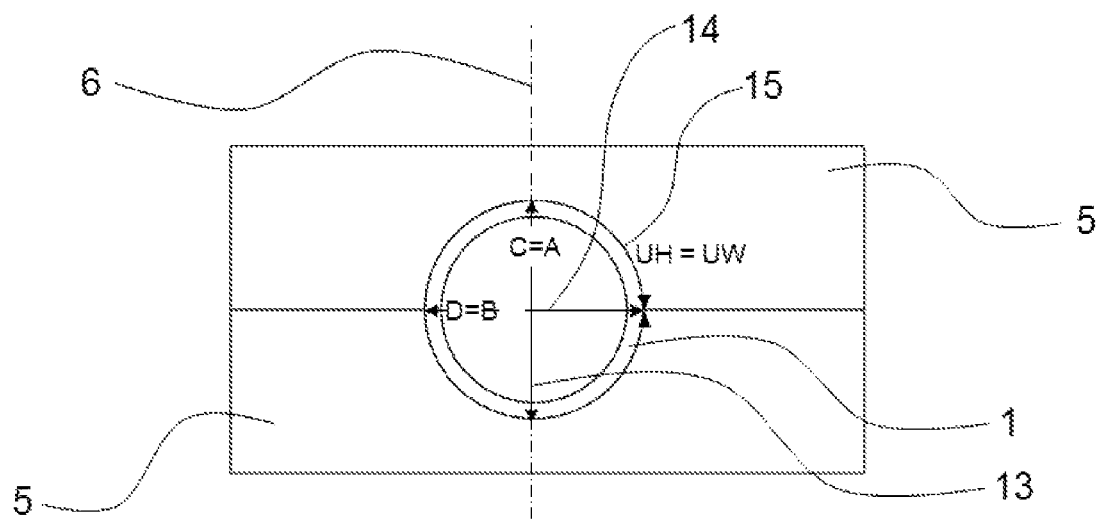

FIG. 4 shows the cross section of an injection mold/compression mold (5) to be used in accordance with the invention in the closed state with the hollow profile (1) inserted in the region of the contact surfaces to the seal (4) present alongside the application of plastic (2) on the hollow profile (1), in the range of 1.0 to 10.0 mm, viewed in the direction of the longitudinal axis (3) (see FIG. 1). (13) represents the outer dimension C of the compressed hollow profile (1) in the region of the contact surfaces to the seal (4), present alongside the application of plastic (2) on the hollow profile (1), in the range of 1.0-10.0 mm, viewed in the direction of the longitudinal axis (3) thereof. After the compression, the outer dimension C is equal to the mold dimension A. (14) represents the outer dimension D of the compressed hollow profile (1) in the region of the contact surfaces to the seal (4), present alongside the application of plastic (2) on the hollow profile (1), in the range from 1.0 to 10.0 mm, viewed in the direction of the longitudinal axis (3) thereof. After the compression, the outer dimension B is equal to the mold dimension D. (15) represents the hollow profile circumference UH of the compressed hollow profile (1) in the region of the contact surfaces to the seal (4), present alongside the application of plastic (2) on the hollow profile (1), in the range from 1.0 to 10.0 mm, viewed in the direction of the longitudinal axis (3) thereof. After the compression, the hollow profile circumference UH is equal to the cavity circumference UW in the region of mold dimension C and D.

It will be understood that the specification and examples are illustrative but not limitative of the present invention and that other embodiments within the spirit and scope of the invention will suggest themselves to those skilled in the art.

What is claimed is:

1. A process for producing a plastic-metal composite component, the process comprising:
   a) providing an injection mold/compression mold having at least one cavity that is openable, a first mold dimension A in a closure direction of the injection mold/compression mold, a second mold dimension B at right angles to the closure direction of the injection mold/compression mold, and a cavity circumference UW corresponding to a circumference of the at least one cavity in a region of the injection mold/compression mold comprising the first and second mold dimensions A and B;
   b) providing at least one hollow profile made of metal with a ratio of diameter to wall thickness in the range from 5:1 to 300:1, wherein a first outer dimension C of at least one hollow profile is greater by a range of 0.1% to 5% than the first mold dimension A, a second outer dimension D of the at least one hollow profile is smaller by a range of 0.1% to 5% than the second mold dimension B, the ranges for the first and second outer dimensions C and D are based on 90° viewed in a direction toward a longitudinal axis of the at least one hollow profile, and a hollow profile circumference UH of the at least one hollow profile corresponds to the cavity circumference UW of the at least one cavity of the injection mold/compression mold provided in a);
   c) inserting the hollow profile into the at least one cavity of the injection mold/compression mold provided in a);
   d) closing the at least one cavity of the injection mold/compression mold in a closure operation of the injection mold/compression mold such that the hollow profile is pressed by a mold closure movement of the closure operation in the closure direction of the at least one cavity and a shape of the at least one hollow profile provided in b) is changed, wherein an outer surface of the at least one hollow profile, after an end of the closure operation, corresponds to an inner shape of the at least one cavity of the injection mold/compression mold provided in a) in a region of contact surfaces at the axial ends of the at least one cavity, where in e) an application of plastic will be externally applied, while the hollow profile circumference UH remains equal to the cavity circumference UW;
   e) externally applying an application of plastic in the form of a melt with a pressure in the range from 1 bar to 1000 bar to the at least one hollow profile;
   f) cooling the application of plastic applied to the at least one hollow profile in e) to produce a finished composite component; and
   g) removing the finished composite component from the injection mold/compression mold, with the proviso, that the injection mold/compression mold seals the at least one cavity, where in e) an application of plastic is externally applied, with respect to one or more regions of the at least one hollow profile in which no plastic is applied in e) upon closure of the at least one cavity of the injection mold/compression mold, the contact surfaces, at the axial ends of the at least one cavity, where in e) an application of plastic is externally applied, of the injection mold/compression mold compress the at least one hollow profile, during closure of the at least one cavity of the injection mold/compression mold, from the first and second outer dimensions C and D of the at least one hollow profile to the first and second mold dimensions A and B of the at least one cavity, and the hollow profile circumference UH remains equal to the cavity circumference UW such that the at least one hollow profile within the injection mold/compression mold undergoes radial sealing of a circumferential face of the at least one hollow profile at the axial ends of the at least one cavity, where in e) an application of plastic is externally applied, to prevent application of plastic in an axial direction in the one or more regions in which no application of plastic is applied.

2. The process of claim 1, wherein a form-fitting bond of the at least one hollow profile and the application of plastic is achieved radially in all directions about a center axis of the at least one hollow profile and rotationally to an axis at right angles to the center axis of the at least one hollow profile.

3. The process of claim 1, wherein, in addition, a bond of the at least one hollow profile and the application of plastic is achieved with a blocking of all degrees of freedom, by translation in X, Y and Z direction and by rotation about the X, Y and Z axis, by means of a surface treatment of an outer wall of the at least one hollow profile.

4. The process of claim 3, wherein the means of the surface treatment selected is at least one of the following forms: application of at least one adhesion promoter, plasma surface activation, laser structuring, chemical pretreatment, and additive manufacturing method.

5. The process of claim 4, wherein means of the surface treatment is one selected from chemical pretreatment utilizing acids or bases and an additive manufacturing method comprising a conducted is the thermal metal spray application method.

6. The process of claim 1, wherein the at least one hollow profile to be provided has structural elements on an outside of the at least one hollow profile.

7. The process of claim 6, wherein the structural elements are fins.

8. The process of claim 1, wherein, before or after d), the at least one hollow profile is deformed at one or more positions by an action of additional flexural forces.

9. The process of claim 1, wherein, before g), the at least one hollow profile is deformed at one or more positions by an action of additional flexural forces.

10. The process of claim 9, wherein the deforming of the at least one hollow profile is effected outside the injection mold/compression mold at any desired position in the at least one hollow profile.

11. The process of claim 1, wherein the finished composite component is a motor vehicle bodywork part.

12. The process of claim 11, wherein the motor vehicle bodywork part is a cross car beam.

* * * * *